3,153,585
ADDING SODIUM AND PHOSPHORUS TO A TUNGSTEN OXIDE REDUCTION PROCESS TO GET LARGE PARTICLE SIZES
John M. Laferty, Jr., Towanda, Pa., assignor to Sylvania Electric Products Inc., a corporation of Delaware
No Drawing. Filed May 9, 1962, Ser. No. 193,596
4 Claims. (Cl. 75—0.5)

This invention relates to tungsten powder and is concerned more particularly with a method for producing tungsten metal powder of particle size larger than has been produced by methods heretofore employed.

In the usual procedure for producing tungsten powder for use in powder metallurgical processes tungsten oxide is reduced in a stream of hydrogen at elevated temperatures. Generally batches of the oxide are loaded into trays or "boats" of refractory metal such as molybdenum or tungsten and the boats are then moved through a furnace having several zones of progressively higher temperatures throughout its length. Typically, the material is heated to a temperature within the range of between about 1600° and 2100° F. in the final, or hottest zone. During this operation a flow of hydrogen is maintained through the furnace to accomplish the reduction of the oxide to the metal.

Tungsten powder produced as described above is very finely divided, typically of the order of about 3 to 10 microns average particle size. Although powder of this degree of fineness is satisfactory and, in fact, preferred for many applications of the powder metallurgy technique, it has been found to be unsuitable in certain applications, particularly those involving automatic or continuous feeding of the powder. This is primarily for the reason that the very finely divided powder is characterized by poor flow and a tendency to "bridge" in the ductwork or other means for conveying the powder to the point of use. Such bridging results in interruption in operations requiring continuous flow and lack of dependability in automatic operations. Plasma jet spraying of tungsten, in which a continuous supply of powdered tungsten at the nozzle of the apparatus must be assured, is typical of this latter type of application of tungsten powder. Similarly, in vacuum fusion processes for making cast tungsten pieces, free flow of the tungsten powder into the melting vessels is essential.

It is well known that by appropriate control of the conditions maintained during the reduction of tungsten oxide to tungsten a certain degree of control of the particle size of the tungsten powder can be realized. More particularly, larger average particle sizes are obtainable by employing temperatures approaching the upper portion of the range of temperatures practicable for the reduction process. It has also been recognized that increased particle sizes tend to result at lower rates of flow of hydrogen and increased residence times of the material in the reduction zone. However, even when all conditions of the reduction process are established, within commercially practical limits, to yield tungsten of maximum average particle size, it has been found that the average particle size of the resulting powder normally will not exceed about 40 microns. As a result, where larger particle size, free flowing, tungsten powder has been desired it has been common to screen and select the large particle portion, leaving a residue of substantial quantities of tungsten powder of relatively small average particle sizes. The objections to this procedure from the standpoint of commercially efficient operation are obvious.

It is, therefore, an object of this invention to provide an improved method for producing tungsten powder involving the reduction of tungsten oxide which affords a material of substantially larger average particle size than previously has been obtainable by the reduction of the oxide.

It is a further object of the invention to provide an improved method involving the reduction of tungsten oxide to tungsten whereby particles of tungsten of sufficiently large average particle size result as to afford a powder which is free-flowing in nature.

It is a still further object of the invention to provide a method for producing elemental tungsten powder from tungsten oxide involving the hydrogen reduction of the tungsten oxide, which method permits the obtaining of powders of large particle size without employing the extreme conditions in the reduction operation heretofore considered essential to the production of such coarse powders.

The foregoing objects are achieved in accordance with the method of this invention by incorporating small amounts of sodium and phosphorus with the tungsten oxide prior to reduction of the oxide. These elements are added in the combined state, and a wide choice of compounds is available for the addition since the small quantity of the element or radical associated with the sodium or phosphorus apparently does not detract appreciably from the marked influence of the principal additives. Illustratively, sodium may be added as the oxide, hydroxide, or salts such as the halides, carbonates or sulphates. The phosphorus may be added to the tungsten oxide, for example, in the form of phosphoric acid or salts of phosphoric acid. From the standpoint of further reducing the possibility of unwanted side effects which might result from the presence of elements other than sodium and phosphorus in the tungsten oxide, it has been found convenient to incorporate these elements in the form of a compound of the two elements such as, for example, a sodium phosphate or sodium phosphotungstate. Where freedom to vary the ratios of phosphorus to sodium is desired, it is convenient to add the elements in the form of sodium hydroxide and phosphoric acid.

It has been found that the amounts of sodium and phosphorus which it is necessary to add to the tungsten oxide are extremely small, amounts as low as 0.001% by weight of each of the elements, based on the tungsten oxide, affording a significant increase in the size of the tungsten particles produced. Substantially larger additions of the two elements may be made but, as will be apparent from the following more detailed description of the process, the influence of the sodium and phosphorus under most conditions of operation does not increase in proporiton to the amounts of the sodium and phosphorus additions. In any event, the addition of more than 0.5% by weight of the tungsten oxide of either sodium or phosphorus should be avoided to prevent any undesired effects on the physical properties of the tungsten produced. In general, the method of the invention is best accomplished by the addition of the sodium and phosphorus in amounts between about 0.01% and 0.4% by weight of the tungsten oxide.

In the following examples and tables explaining the method and results obtainable by the use of the method of the invention all percentages are in terms of weights of the materials.

In the method of the invention the compound or compounds containing the sodium and phosphorus are thoroughly mixed with the starting tungsten oxide. This may be done by adding the sodium and phosphorus containing materials directly to the dry tungsten oxide powder and then mixing thoroughly in a blender, ball mill, or any other suitable dry mixing apparatus. Alternatively, the mixing may be accomplished by preparing a slurry of the tungsten oxide in water and adding the sodium and phosphorus compounds to the slurry followed by thorough agitation of the slurry to insure uniform distribution of the compounds throughout the tungsten oxide.

The water is then evaporated from the mixture and the treated tungsten oxide is thoroughly dried. The dried oxide then is placed in a number of small batches in tungsten trays. These trays are moved through a tubular furnace maintained at a predetermined maximum temperature within the range of about 1600° F. to 2100° F. In certain cases, in order to obtain a desired range or distribution of particle sizes, several zones of progressively increasing temperatures may be maintained in the furnace so that the material reaches the maximum temperature in the above range only in the last zone.

In order to maintain a reducing atmosphere in the funace a steady stream of hydrogen is supplied to the furnace during the operation. As pointed out previously in this specification it has been recognized that a reduction in the rate of hydrogen flow tends to produce larger particle tungsten. This same influence is observed in the method of this invention, apparently because of the increased water vapor content in the furnace atmosphere at lower hydrogen flow rates.

Normally the period of residence of each batch of material in the furnace is between about 3 and 9 hours, tungsten of larger particle sizes being produced by the longer residence, other conditions remaining the same.

It is of course to be realized that the conditions of batch size, temperature, rate of hydrogen flow, and residence times may be widely varied, as is characteristic of chemical operations of this nature; and conditions outside the ranges mentioned above may be employed without departing from the contemplated scope of the present invention.

In a specific example of the novel procedure more generally described above, 150 pounds of tungsten oxide were added to approximately 30 gallons of water. The mixture was agitated to form a slurry and 25.4 pounds of sodium phosphotungstate was added to the slurry. Agitation was continued for about 15 minutes to insure uniform distribution of the sodium phosphotungstate throughout the tungsten oxide. The slurry was then dried completely with continued agitation in a steam jacketed kettle. Analysis of the dried material indicated a sodium content of 0.28% and a phosphorus content of 0.15% indicating that the sodium phosphotungstate used to "dope" the tungsten oxide was not entirely the trisodium salt of phosphotungstic acid. The dried mixture was loaded into elongated tungsten trays in quantities of about 1000 grams per tray and the loaded trays were then pushed through a tubular furnace maintained at a temperature of about 1900° F. The rate of movement of the trays through the furnace was such that each batch of treated tungsten oxide was in the furnace for a period of about 6 hours. Hydrogen was passed through the furnace at the rate of 40 cubic feet per hour. After removal of the tungsten from the furnace, and cooling, a screen analysis of the resulting tungsten powder was made with the re-results indicated under Test 1 in Table I, below.

In order to evaluate the effect of the incorporation of sodium and phosphorus in the starting tungsten oxide, another test was made using the procedure described in the preceding paragraph except that no addition of sodium phosphotungstate was made and the reduction furnace was maintained at 2100° F. A screen analysis of this latter test is set forth under Test 2 in Table I.

*Table I*

| Screen Size Range | Test 1 (Percent) | Test 2 (Percent) |
| --- | --- | --- |
| +60 | 0.4 | 0.0 |
| −60 +100 | 17.0 | 0.0 |
| −100 +200 | 68.5 | 6.0 |
| −200 +250 | 4.6 | 7.0 |
| −250 +325 | 5.5 | 6.0 |
| −325 | 4.0 | 81.0 |
| | 100.0 | 100.0 |

As is clearly evident from the results shown in Table I tungsten powder of much larger particle size resulted in Test 1 in which sodium and phosphorus in amounts of 0.28% and 0.15%, respectively, were incorporated with the tungsten oxide. The results are particularly remarkable in view of the fact that in Test 2 the reduction was carried out at the substantially higher temperature of 2100° F. and, as previously indicated in this specification, use of higher reduction temperatures normally result in tungsten powder of increased particle size.

The method of the invention has been found to be effective throughout the range of reaction conditions commonly employed in the reduction of tungsten oxide. For example, in two comparative tests tungsten oxide was reduced as described above in reference to Test 1 except that in the reduction furnace the hydrogen flow rate was set at 100 cubic feet per hour instead of 40 cubic feet per hour. In addition, instead of the higher temperatures employed in Tests 1 and 2, the temperatures within the furnace along the path of movement of the trays loaded with tungsten oxide were maintained in three consecutive zones at progressively increasing temperatures of 1100° F., 1520° F. and 1625° F. In one of these comparative tests no doping materials were added to the tungsten oxide. In the other test sufficient sodium phosphotungstate was added to the oxide to afford a phosphorus content of about 0.05% and a sodium content of about 0.10%. Under these conditions of operation the tungsten powder produced in both tests was of small particle size, less than could be measured by the usual screen analysis technique. However, when the powders were measured by means of a Fisher Sub Sieve Sizer apparatus it was determined that the average particle size of the powder obtained from the oxide in which phosphorus and sodium had been incorporated was 8.7 microns. In the test in which sodium and phosphorus were not added as dopants the average particle size of the tungsten produced was only 2.8 microns.

As indicated above in this specification, results of tests of the method herein disclosed indicate that the influence on the powder particle size of the combination of sodium and phosphorus additions to the tungsten oxide generally is only to a slight dependent on the quantities of the additions. It appears that there is a small threshold quantity, of the order of 0.001%, of each of the doping elements at which their influence on the particle size of the tungsten powder becomes evident. The degree of influence of the elements increases rapidly with the quantities added to the tungsten oxide so that within the practical limits of additions of 0.01% to 0.4% previously indicated, and except in those cases where more vigorous reducing conditions are employed, there is a wide degree of tolerance in carrying out the process. This is illustrated by tests of the method in which tungsten oxide was reduced to the metal powder under the conditions described above in connection with Test 1 except for variations in the amounts of sodium incorporated in the tungsten oxide. In these tests phosphorus was added as phosphoric acid in each case in the amount of 0.15% of the tungsten oxide. In one test (Test 3) sodium, as sodium hydroxide, was incorporated with the tungsten oxide in the amount of 0.07%. In another test (Test 4), sodium, again added as sodium hydroxide, in the amount of 0.14% was employed. The results of the screen analyses of the tungsten powder produced in these two tests is set out in Table II, below. In addition, the results of Test 1 are also reproduced in Table II for comparison purposes since they illustrate the results obtained under identical reduction conditions, but with a still larger quantity of sodium (0.28%) added to the tungsten oxide. Although sodium phosphotungstic acid was employed as the doping medium in Test 1 instead of sodium hydroxide and phosphoric acid, it has been found that in the small quantities of doping material contemplated by the present method, no significant differences in the final product result from the use of different mediums of sodium and phosphorus additions.

Table II

| Screen Size Range | Test 1 0.28% Na, 0.15% P (Percent) | Test 2 0.14% Na, 0.15% P (Percent) | Test 3 0.07% Na, 0.15% P (Percent) |
| --- | --- | --- | --- |
| +60 | 0.4 | 10.0 | 11.0 |
| −60 +100 | 17.0 | 47.0 | 45.0 |
| −100 +200 | 68.5 | 35.0 | 35.0 |
| −200 +250 | 4.6 | 3.5 | 3.5 |
| −250 +325 | 5.5 | 3.5 | 3.5 |
| −325 | 4.0 | 1.0 | 2.0 |
| | 100.0 | 100.0 | 100.0 |

From the results of the screen analyses set out in Table II it is clear that within the limits of accuracy of control of a reduction operation of this nature, there is little evidence of any pattern of difference in results obtained by varying the amounts of sodium added to the tungsten oxide. Although the distribution of the particle sizes in the three tests was slightly different, it is apparent that in all three cases less than 20% of the tungsten powder was smaller than 200 mesh in size. Furthermore, it is quite clear that the particle sizes obtained during each of these three tests were much greater than the particle sizes of Test 2 shown in Table I in which 94% of the powder was less than 200 mesh particle size. Although in Test 2 a higher reducing temperature of 2100° F., which normally would result in a powder of larger particle size than is obtainable at the 1900° F. temperature of Tests 1, 3 and 4, no phosphorus or sodium additions were made to the tungsten oxide in Test 2. Thus, here again, the advantages of the present method in obtaining tungsten powders of increased particle size are readily apparent.

Experience with the novel process herein described indicates that under more extreme conditions in the reduction step of the process the effect of increases in the quantities of sodium and phosphorus added to the starting tungsten oxide is more marked. As an illustration of this, two tests were made in which the process was carried out in the same manner as described above in connection with Test 1 except that the temperature was maintained at 2000° F. rather than at 1900° F. Under these conditions, one test (Test 5) was made in which sodium and phosphorous in amounts of 0.28% and 0.15%, respectively, were added to the tungsten oxide prior to reduction. In another test (Test 6) the amounts of sodium and phosphorus added were only 0.02% and 0.01%. The results of these tests are given in Table III, below.

Table III

| Screen Size Range | Test 5 (Percent) | Test 6 (Percent) |
| --- | --- | --- |
| +60 | 72.0 | 6.0 |
| −60 +100 | 19.0 | 46.0 |
| −100 +200 | 8.0 | 43.0 |
| −200 +250 | 0.5 | 3.0 |
| −250 −325 | 0.5 | 1.0 |
| −325 | 0.0 | 1.0 |
| | 100.0 | 100.0 |

It is evident from the test results of Table III that the more than tenfold larger additions of sodium and phosphorus used in Test 5 as compared with the additions used in Test 6 resulted in substantially larger particles of tungsten powder. More particularly, 72% of the tungsten powder produced in Test 5 was of particle size greater than 60 mesh. Only 6% of the tungsten powder of Test 6 was of particle size greater than 60 mesh.

Although it has been observed that additions to the tungsten oxide of small quantities of sodium without the addition of phosphorus, or vice versa, tends to result in tungsten powders of larger particle size, the effect of such additions of the single doping elements is substantially less than the effect obtained by the addition of both elements. Two tests described below illustrate the effect of additions to the tungsten oxide of a single one of each of the doping elements. The procedure described in connection with Test 1 was employed except that in one case 0.30% sodium as sodium chloride was added to the tungsten oxide. In the other case 0.15% phosphorus was added as phosphotungstic acid. The screen analyses of the tungsten powders obtained from these tests is shown in Table IV.

Table IV

| Screen Size Range | Test 7 0.30% Na (Percent) | Test 8 0.15% P (Percent) |
| --- | --- | --- |
| +60 | 0.0 | 0.0 |
| −60 +100 | 0.0 | 0.3 |
| −100 +200 | 0.0 | 12.3 |
| −200 +250 | 3.7 | 8.0 |
| −250 +325 | 66.6 | 26.2 |
| −325 | 29.7 | 53.2 |
| | 100.0 | 100.0 |

From a comparison of the results of Tests 7 and 8 with those of Test 2 shown in Table I, it is evident that the additions to the starting tungsten oxide of small quantities of sodium and phosphorus, individually, exhibit a definite tendency to afford tungsten powders of increased particle sizes. However, further comparison of these test results with the screen analysis listed under Test 1, in which test both sodium and phosphorus were added to the tungsten oxide, makes it clear that the influence of the addition of both doping elements produces results of significance much greater than normally would be anticipated from the effect of the individual doping additions.

What is claimed is:

1. A method for producing tungsten powder which comprises the steps of thoroughly mixing with tungsten oxide a sodium compound and a phosphorus compound, the amount of each of said compounds being such as to afford in the resulting mixture, each of the sodium and phosphorus elements, in an amount between 0.01% and 0.4% by weight of the tungsten oxide and thereafter passing the mixture through a hydrogen atmosphere at a temperature sufficient to cause the reduction of tungsten oxide to metallic tungsten.

2. A method for producing tungsten powder which comprises the steps of mixing water with tungsten oxide to form an aqueous slurry of tungsten oxide; adding to said slurry a sodium compound and a phosphorus compound in amounts sufficient to provide in the slurry each of the elements of sodium and of phosphorus in an amount between 0.01% and 0.1% by weight of the tungsten oxide; evaporating the water from the slurry to produce a dry intimate mixture of the tungsten oxide and the sodium and phosphorus compounds; and thereafter heating the mixture in a hydrogen atmosphere to produce tungsten metal powder.

3. A method for producing tungsten powder consisting primarily of particles of size less than 60 mesh and greater than 325 mesh which comprises the steps of mixing water with tungsten oxide to form an aqueous slurry of tungsten oxide; adding to said slurry a sodium compound and a phosphorus compound in amounts sufficient to provide in the slurry each of the elements of sodium and of phosphorus in an amount between 0.01% and 0.4% by weight of the tungsten oxide; drying the slurry to produce an intimate mixture of the tungsten oxide and the sodium and phosphorus compounds; and thereafter heating the dried mixture in a stream of hydrogen at a temperature of between about 1600° F. and 2100 F. for a period of between about 3 and 9 hours.

4. A method for producing tungsten powder which comprises the steps of mixing 150 pounds of tungsten oxide with water to form an aqueous slurry of the tungsten oxide; mixing with said slurry 25.4 pounds of sodium phosphotungstate; evaporating the water from the slurry to form a dry intimate mixture of the tungsten oxide and sodium phosphotungstate; and heating the dried mixture at a temperature of about 1900° F. in a hydrogen atmosphere for a period of about 6 hours.

References Cited in the file of this patent

UNITED STATES PATENTS

| | | |
|---|---|---|
| 946,551 | Majert | Jan. 18, 1910 |
| 1,081,567 | Becket | Dec. 16, 1913 |
| 1,088,909 | Kuzel et al. | Mar. 3, 1914 |
| 1,270,842 | Keyes | July 2, 1918 |
| 1,558,000 | Fernberger | Oct. 20, 1925 |
| 1,559,799 | Smithells | Nov. 3, 1925 |
| 2,225,204 | Best | Sept. 9, 1941 |
| 2,463,367 | Fink et al. | Mar. 1, 1949 |
| 2,798,808 | Iredell et al. | July 9, 1957 |
| 2,829,962 | Supiro | Apr. 8, 1958 |
| 2,966,406 | Spier et al. | Dec. 27, 1960 |

OTHER REFERENCES

Spier et al.: Articles, pages 149–156 of the Philips Research Reports, volume 13, No. 2, April 1958.

Leo et al.: Article, page 461, Trans. The Electrochemical Soc., volume 66 (1934).